(12) United States Patent
Sisk (10) Patent No.: US 10,145,500 B2
(45) Date of Patent: Dec. 4, 2018

(54) STRUCTURED TEE WITH WEAR POCKET

(71) Applicant: David E Sisk, Bonne Terre, MO (US)

(72) Inventor: David E Sisk, Bonne Terre, MO (US)

(73) Assignee: Bulk Tank, Inc, Park Hills, MO (US)

( * ) Notice: Subject to any disclaimer, the term of this patent is extended or adjusted under 35 U.S.C. 154(b) by 0 days.

(21) Appl. No.: 15/731,009

(22) Filed: Apr. 6, 2017

(65) Prior Publication Data

US 2017/0219149 A1 Aug. 3, 2017

Related U.S. Application Data (63) Continuation-in-part of application No. 14/121,161, filed on Aug. 7, 2014, now abandoned, which is a continuation-in-part of application No. 13/987,331, filed on Jul. 15, 2013, now abandoned, which is a continuation-in-part of application No. 12/249,672, filed on Oct. 10, 2008, now Pat. No. 8,091,925.

(60) Provisional application No. 61/030,777, filed on Feb. 22, 2008.

(51) Int. Cl.
| | |
|---|---|
| *F16L 57/06* | (2006.01) |
| *F16L 41/02* | (2006.01) |
| *B65G 53/52* | (2006.01) |

(52) U.S. Cl.
CPC .......... *F16L 41/021* (2013.01); *B65G 53/523* (2013.01); *F16L 57/06* (2013.01)

(58) Field of Classification Search
CPC ....... F16L 41/02; F16L 41/021; F16L 41/026; F16L 47/28; F15D 1/02; B65G 53/523
See application file for complete search history.

(56) References Cited

U.S. PATENT DOCUMENTS

| | | |
|---|---|---|
| 253,908 A | 2/1882 | Brady |
| 788,803 A | 5/1905 | Walker |
| 924,839 A | 6/1909 | Schmidt |
| 1,022,044 A | 4/1912 | Oakes |
| 1,208,049 A | 12/1916 | Tillman |
| 1,733,823 A | 10/1929 | Redlon |
| 3,346,887 A | 10/1967 | Sommer |
| 3,894,302 A | 7/1975 | Lasater |
| D297,678 S | 9/1988 | Sisk |
| 4,848,396 A | 7/1989 | Sisk |
| 4,889,318 A | 12/1989 | Sisk |
| 5,387,015 A | 2/1995 | Sisk |
| D358,202 S | 5/1995 | Sisk |
| D376,416 S | 12/1996 | Sisk |
| 5,676,404 A | 10/1997 | Sisk |
| 5,842,681 A | 12/1998 | Sisk |

(Continued)

FOREIGN PATENT DOCUMENTS

GB 1385445 2/1975

*Primary Examiner* — David Bochna
*Assistant Examiner* — James A Linford
(74) *Attorney, Agent, or Firm* — Paul M. Denk (57) ABSTRACT

A hopper tee having a horizontal portion through which granular material is unloaded from a tank trailer or hopper car, the hopper tee integrally forms a vertical segment, that secures with the bottom of the hopper, to provide for unloading of granular material for usage or storage. The upper front portion of the tee, as it transitions from its vertical segment to the horizontal flow path has secured or cast therewith a ledge, that provides for accumulation of the unloading granular material therein, to function as a wear pad to resist against abrasion and accelerated wear out of the tee, at that location, during prolonged usage.

20 Claims, 4 Drawing Sheets

(56) References Cited

U.S. PATENT DOCUMENTS

| | | |
|---|---|---|
| 6,056,014 A | 5/2000 | Kojima et al. |
| 6,582,160 B2 | 6/2003 | Campbell et al. |
| 6,786,362 B2 | 9/2004 | Sisk |
| 6,991,263 B2 | 1/2006 | Zarubaiko |
| 7,568,496 B2 | 8/2009 | Kraenzle |
| 7,988,386 B2 | 8/2011 | Sisk |
| 8,091,925 B2 | 1/2012 | Sisk |
| 2011/0108125 A1 | 5/2011 | Corn et al. |

STRUCTURED TEE WITH WEAR POCKET

CROSS REFERENCE TO RELATED APPLICATION

This continuation in part patent application claims priority to the continuation in part patent application having Ser. No. 14/121,161, filed on Aug. 7, 2014 which claims priority to the continuation patent application having Ser. No. 13/987, 331, filed on Jul. 15, 2013, which claims priority to the non-provisional patent application having Ser. No. 12/249, 672, filed on Oct. 10, 2008, and which claims priority to the provisional patent application having Ser. No. 61/030,777, filed on Feb. 22, 2008, now U.S. Pat. No. 8,091,925.

FIELD OF THE INVENTION

This invention relates to an improved means for conveyance of granular material, and more specifically pertains to a tee device that connects to the bottom of a hopper of a tank trailer, or other vehicle, and which has reinforcement that resist against wear through abrasion.

BACKGROUND OF THE INVENTION

This invention relates generally to hopper tees, as used in bulk material handling, and more specifically pertains to a hopper tee that is reinforced to provide a padding to resist against abrasion and premature wear to the tee at those locations were granular material excessively impinges against during unloading of a tank trailer, hopper car, or the like.

Hoppers, or tank trailers, regularly transport bulk commodities such as industrial and food products, and even such abrasive materials such as sand, or other pelletized materials. When the hopper, or tank trailer, reaches its destination, the bulk commodity is unloaded, typically by a power takeoff driven from a truck mounted blower or a pneumatic system of a plant or factory. The bulk commodity generally unloads from the hopper and into a pipeline. To complete the unloading, hopper tees are mounted to the discharge outlet of the hoppers, or bins, the hopper tee conventionally has a vertical section of constant dimension and shape and a horizontal section also of consistent dimension and shape forming the inverted tee shape configuration. To transfer the bulk commodity, the materials move out of the hopper, or bin, by gravity flow or air pressure vibration into the vertical section of the hopper tee. The discharge pipe is connected to the horizontal section of the tee. Pneumatic conveyance of the bulk material through the pipe occurs by establishing a pressure differential in the pipe. Usually, the prior art hopper tees have a complete, one piece assembly that includes a vertical section, connecting to a hopper, and a horizontal section, connecting to a discharge pipe. The prior art hopper tee design fits on the bottom of the bins of pneumatic tank trailers. Typically, the butterfly valve of the bin bolts to the flange of the hopper tee. Although, prior art hopper tees function well for their intended purposes, some tees are structured where the granular material being unloaded will impinge upon specific surfaces of the tee, under pressure, and has a tendency to cause abrasion, if not eventual wear through of the tee at these active locations of the tee structure.

DESCRIPTION OF THE PRIOR ART

A variety of patents have issued upon various devices to ease the transfer and unloading of bulk granular ingredients from a hopper or bin into a discharge line for delivery to a plant or factory. Prior art hopper tees have a construction of a vertical pipe welding to horizontal pipe in a generally tee shape. Or, such tees may be cast in their integral shape and structure. These tees remain subject to excessive internal wear by the friction of the bulk material and eventually fail as they wear away. Previously, the applicant had addressed such wear problems. The U.S. Pat. No. 4,848,396, to Sisk, discloses a Cast Hopper Tee designed to provide a smooth and uninterrupted internal transitional surface: That patent also provided for such an improvement in a bottom drop hopper tee.

The patent to Tillman, U.S. Pat. No. 1,208,049, shows a pipe fitting, which has an abutment lip within its fluid passageway, like a weir, that separates cold water from hot water flowing through the distributing pipe.

The U.S. patent to Campbell, et al, U.S. Pat. No. 6,582, 160, provides a hopper tee and integral discharge valve. This hopper tee has an inlet that connects to a hopper discharge opening and a perpendicular second hollow pipe section. The inlet has a cylindrical sidewall, and the hollow pipe section also has a cylindrical cross section, that shows an interior tapering of the inlet and the second hollow pipe section.

The U.S. patent to Kraenzle, U.S. Pat. No. 7,568,496, shows a dual flange tee. This tee also shows upper and lower pipe sections, which form the structure of the tee.

U.S. Pat. No. 5,387,015, to Sisk, the inventor herein, is a single piece Hopper Tee with an elliptically shaped opening within the neck. Generally a first pipe in the flange joins perpendicularly to an edge of the second pipe that then connects to the pipeline tubing.

A design patent to Sisk, U.S. No. D376,416, shows the physical appearance and ornamentation of a Directional Flow Structural Tee.

Another patent to Sisk, U.S. Pat. No. 5,676,404 shows a Low Profile Flanged Tee akin to the Kraenzle structure referred to above. This patent shows a tee with a diameter of the hollow pipe section increases proximate the opening to the discharge hopper.

The U.S. Pat. No. 5,842,681, to Sisk, describes a Pivotal Hopper Tee with Alignable Swing-Away Hopper Tee Assembly. This hopper tee has a mounting frame that connects to the hopper discharge and a camming handle with a hook that swings upon its pivot arms.

Another U.S. Pat. No. 6,786,362, to Sisk, is similar to the '681 patent. This is a Swing-Away Hopper Tee that has a mounting frame that connects to the tee assembly.

The prior art discloses various hopper tees, with a flat door, large wings extending coplanar with the door, or the drop portion of the tee, as to be noted. Over time, with rugged usage, and subject to environmental factors, portions of the tees can be abrasively diminished in thickness, particularly at that location where the vertical portion of the tee transitions into the forwardly extending horizontal portion of the tee, with the abrasive material both dropping from the proximate hopper can impinge upon its surface, particularly when the tee may be downstream from a series of other tees that are unloading similar granular material, and the granular materials are thrust against that transitional surface of the tee continuously until unloaded.

SUMMARY OF THE INVENTION

This invention provides a hopper tee with an internally reinforced portion that provides essentially a ledge that creates a collection area, where a pad of the granular material being unloaded can collect, and function just that, as a wear pad that guards against direct contact of the moving granular material against the internal surface of the cast tee, at that transitional area between the neck of the tee, and its horizontal conveying portion, to resist against premature wear and abrasion of the tee at that location, thereby enhancing its useful life. Furthermore, it prevents any contamination from entering into the unloaded material, which is a necessity particularly where food product may be conveyed, such as grains, other granular food product, polymer pellets that are useful for molding food containers, and the like.

Essentially this invention contemplates the formation of additional structure within a cast hopper tee, and which can function to provide for accumulation of the unloading granular material thereat, to essentially accumulate a bulk of such material at that location where impingement of the granular material against the internal structure of the tee most likely occurs, and therefore, uses the same granular material to resist against abrasion of the tee, and thereby avoid the problems as previously described.

As a real example of the type of granular materials that may cause wear, eventually, within a tee, particularly at the upper portion were it transitions from its vertical part to its horizontal portion, sand, such as industrial sand, that may be utilized within a chemical operation, or in some other plant processing, may be the type of granular material that is conveyed by the tank trailer to the site of its usage. When that is the case, sand is highly abrasive, and does have a tendency to wear out these industrial tees, that are principally used in the unloading of such materials from a tank trailer, or the like. Thus, providing for reinforcement in the manner of this current invention not only utilizes the unloading material itself as a wear pad, but substantially reduces the abrasive effect that causes an eventual wear out of the tee, when used over a period of time.

The structure of the tee is generally formed in the manner as previously known in the art, includes a longitudinal portion through which the material generally flows, and this portion of the tee normally incorporates some type of a bell portion, that allows for its interconnection with the pipeline that conveys the pressurized air, through the unloading pipe, drawing the granular material from the various hoppers, through their tees, and conveying such material for storage or use at a distant location. Such tees, as known in the art, also include a vertical section, that is integrally cast or formed with the unitary tee, and normally includes curvature at its forward portion, to provide for a smoother transition of the bulk material, as it descends from the hopper, through the vertical part of the tee, and is picked up by the conveying air pressure within the horizontal section of the tee, and its interconnected pipeline, for transit during unloading.

As previously commented, that curved portion of the tee between its vertical and horizontal sections, at their frontal area, has a tendency to have the bulk material thrust against it, continuously, during the unloading process, and which functions to generate abrasiveness that can eventually wear upon the metallic structure of the tee, to the extent where it eventually will wear thin, if not wear all the way through, making the tee useless and requiring its replacement. To solve this problem, the current invention integrates or connects a ledge like member, that is generally arranged tangent to the outlet portion of the horizontal section of the tee, so that material may accumulate above the ledge and create a surface or wear pad that protects that integral arcuate portion of the tee against impingement thereagainst of the granular material being unloaded, and therefore functions, as explained, as a wear pad against premature or routine deterioration. Such a ledge can be cast integrally within the structure of the tee, and this is regardless whether the tee, as normally, is cast of iron or metal, and such a structure could even be used in tees that are formed of hardened polymer, and which may be used similarly, for transfer of other types of granular material, during their unloading. The ledge can be either cast in place, or welded internally of the tee, in order to form that compartment that is readily disposed for collection of the unloading material, promptly, as the granular material is initially being unloaded, in order to furnish that wear pad that sustains throughout the entire unloading procedure, and until all the granular material has been removed. The shape and configuration of the ledge, particularly at its front edge, can be to that shape which desirably forms the material pad as described, while the peripheral edges of the ledge will undertake those contours that allows for it to mate internally with the tee, at the location where the ledge internally contacts the interior surface of the tee, so that it can be welded in place, if not cast in place.

It is, therefore, the principal object of this invention to provide means for furnishing a wear pad of granular material being unloaded through a hopper tee, so as to resist against abrasion to the proximate surface of the internal part of the tee where the pad is formed.

Another object of this invention is to provide means for accumulating a wear pad of unloading granular material and which, when formed, undertakes a contour that further aids in the transition of the granular material from the hopper, through the tee, and into the outlet line, during its unloading.

Another object of this invention is to provide an integral hopper tee where a ledge can be cast in situ during the casting of the tee into its usable configuration.

Still another object of this invention is to provide a tee that facilitates the removal of granular material from a tank trailer, which greatly lengthens its useful life, without detracting from the uniformity of removal of material during its unloading.

Still another object of this invention is to provide a ledge that is tangentially cast or welded to the vertical part of the hopper tee, and generally inline with the upper apex of the horizontal or outlet portion of the tee in its structural assembly.

These and other objects may become more apparent to those skilled in the art upon review of the invention as provided herein, and upon undertaking a study of description of its preferred embodiment, in view of the drawings.

DESCRIPTION OF THE PREFERRED EMBODIMENT

Figure 1:
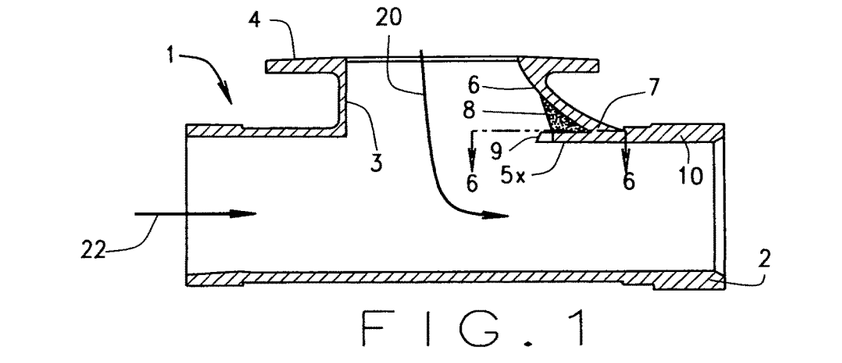
FIG. 1 is a longitudinal sectional view through the hopper tee of this invention, showing the location of its integral ledge that forms a pocket in which product may accumulate and furnish a pad surface that resists against wear of the tee at that location.

In referring to the drawings, and in particular FIG. 1, therein can be seen the hopper tee 1 that incorporates its horizontal longitudinal section 2 which is essentially a horizontal conduit through which the bulk material 20 flows, as it is being moved by air pressure 22 through the outlet line (not shown) that connects with both ends of the tee 1, as can be understood. The vertical section 3 of the tee 1 is usually integrally cast when the tee 1 is formed, and includes an outwardly extending flange portion 4 which includes a series of apertures and allows for the tee 1 to be connected to the bottom of the hopper bin, to be unloaded, or to a butterfly valve, or a swing-away type of valve, as known in the art.

The essence of the current invention is the application of a ledge, as at 5x, to the upper front portion of the tee, and this ledge can be integrally cast in place, or it can be welded in situ, as the tee is being formed. The front edge of the ledge may be beveled, as at 9.

As previously explained, the upper front portion of the tee 1, as at 6, includes a curved portion, and this is to help facilitate the downwardly flow of the unloading granular material 20, and it shifts forwardly by the air pressure 22 passing through the horizontal section 2 of the tee 1, so that the bulk material is thrust forwardly, during its movement, with least resistance. But, as previously explained, where more abrasive type of material is being unloaded, that material is thrust against that curved portion of the tee 1, as it drops and is moved forwardly, and acts as an abrasive against that part of the tee 1, which can through resistance eventually wear out, if not wear through, the tee 1 at that location. This leads to accelerated deterioration of the tee 1, and its need for replacement. This type of abrasion frequently occurs where abrasive type material is being unloaded, whether it be industrial granular material, such as sand, or industrial type sand that may be used in chemical operations, or even some granular type food products that are conveyed by tank trailers, or hopper cars, and which are unloaded in a similar fashion, through a series of inline tees, and the outlet pipes, subject to the pressurized airflow.

Figure 1A:
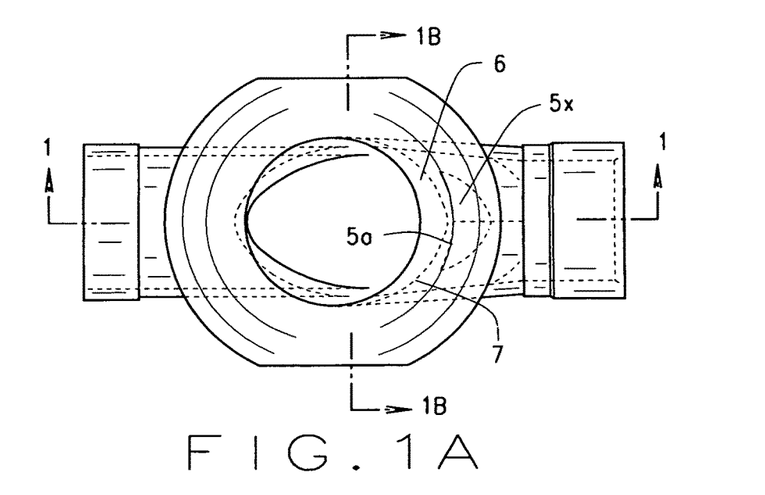
FIG. 1A is a top view of the tee with wear pocket.
Figure 1B:
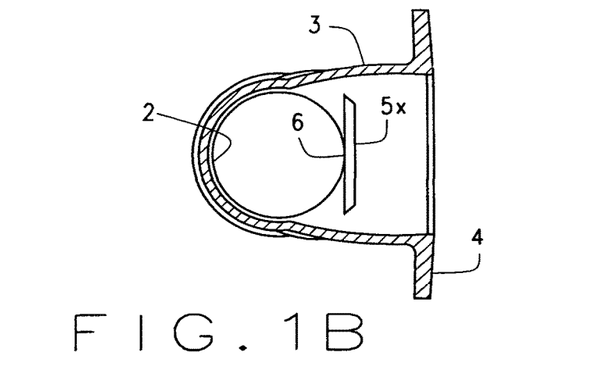
FIG. 1B is a sectional end view showing the location of the ledge being applied tangentially to the upper apex of the horizontal portion of the formed tee.

The ledge 5x as noted and as can be seen in FIGS. 1A and 1B, may undertake an arcuate type shape, and it is either cast along the interior walls of the vertical portion 3 of the tee 1, where it transitions into the horizontal section 2, generally at that location as noted at 7. As noted, the ledge 5x is of relatively shallow shape, but is sufficient to allow for the accumulation of the granular material between its upper surface, and the inner arcuate portion of the front of the tee, as at the curved portion of the upper front portion 6, with the accumulated product or granular material being shown at 8 and therein functioning as a formed wear pad, against which other granular material being unloaded will impinge, so that the granular material as it flows does not rub against the interior arcuate section of the pipe, but rather, acts or biases against the formed wear pad 8, as can be noted. Thus, abrasion does not occur to the tee 1 because the unloading granular material or product does not rub against the internal surface of the tee 1, at that location, but rather, biases against its own product, as can be seen.

Figure 2:
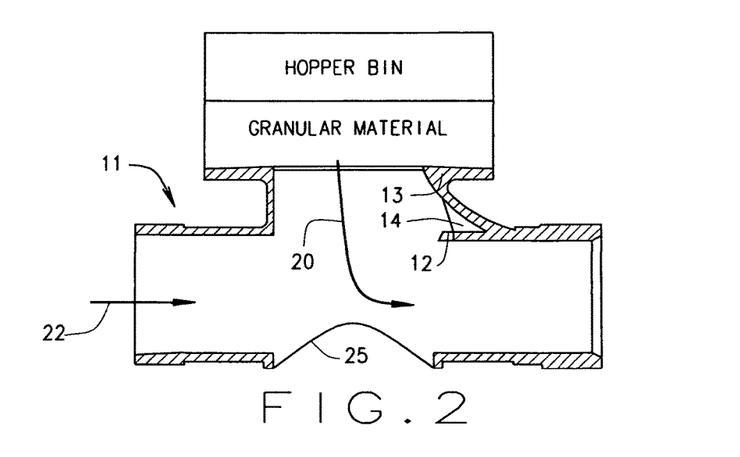
FIG. 2 is a longitudinal sectional view of a similar type tee, of the type that incorporates a bottom drop.
Figure 2A:
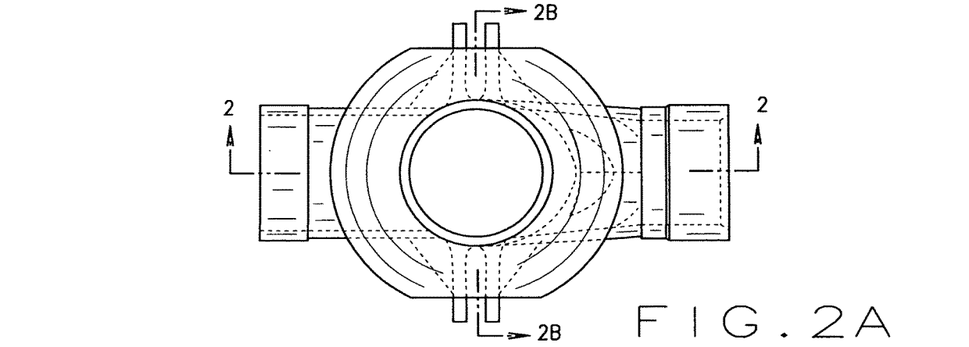
FIG. 2A is a top view of the tee with wear pocket.
Figure 2B:
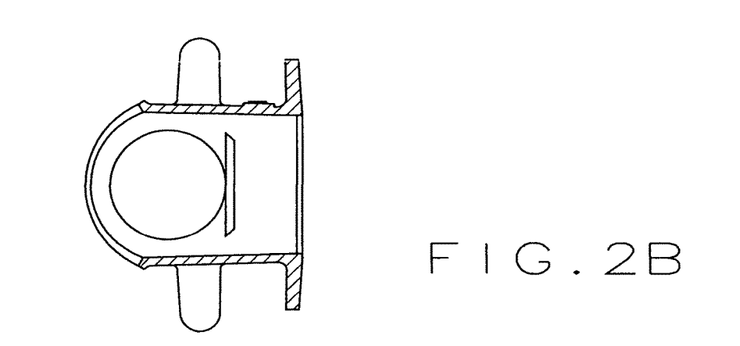
FIG. 2B is a transverse sectional view through the tee showing the location of its integral ledge provided within the vertical portion of the formed tee.

As can be seen in FIGS. 2A and 2B, the ledge 5x either will be integrally cast within the tee forming that pocket surface along the interior of the tee, at that location, or the ledge 5x may be independently formed, if casting is difficult, and then welded into position to form its noted ledge, in the manner as shown and described for its usage with respect to FIG. 1. In this design, the ledge is formed as a concave, as noted at 5A.

As also noted in FIG. 1B, the ledge 5x is generally arranged and formed tangentially with the upper surface 9 of the horizontal section 2, and it mates essentially all the way around the circumference, from side to side, at that region of the juncture between the arcuate portion of the vertical section 3 of the tee 1, as it transitions into the upper horizontal wall 10 of the tee 1, as can be noted.

FIGS. 2, 2A, and 2B, show a similar type construction for the formed tee 11 and its ledge 12 also as either integrally cast or welded in place, to the vertical arcuate section 13 of the formed tee, similar to that for the structured tee as previously described with regard to FIG. 1. In this instance, this is a bottom drop tee, as known in the art, otherwise the structure of the tee is similar to that as previously described, and which incorporates the sand wear pocket 14 which fills up with the sand or other granular material being unloaded, to form that shown wear pad, to substantially reduce the abrasive wear that occurs at that location of the tee, as the granular material is being unloaded. The bottom drop opening, as identified, can be seen at 25.

Figure 3:
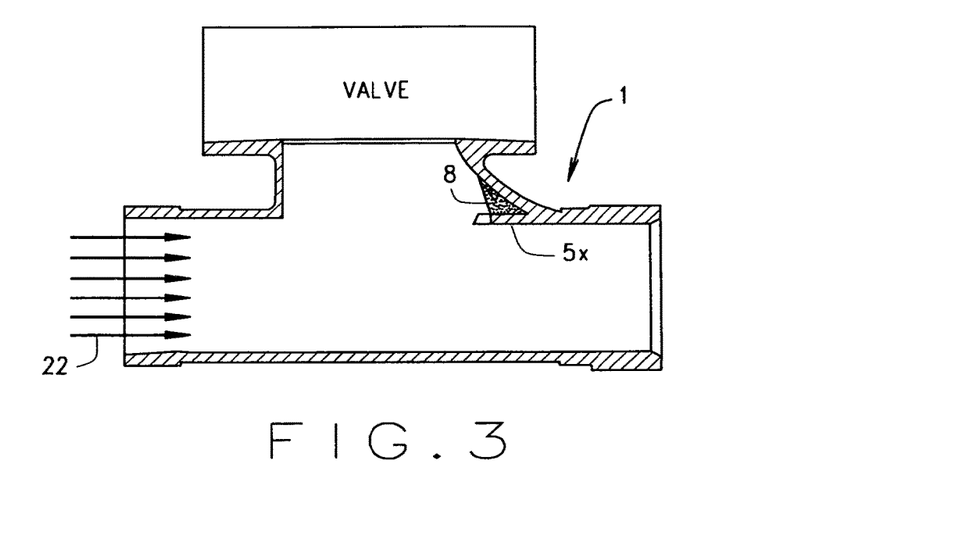
FIG. 3 is a schematic of the material flow dropping down through the tee, filling the wear pocket as noted, and being picked up by the material flow passing through the outlet line and the horizontal portion of the tee during product unloading.

FIG. 3 shows how the material 20 flows dropping from the bin of a tank trailer and falls downwardly and is entrained within the air and material 22 flowing and passing through the horizontal portion of the same tee 1, filling the ledge 5x and wear pad 8 provided therein, to achieve the benefits and results of this invention, which is to minimize wear of the arcuate portion of the tee 1 at the location of said pad 8.

Figure 4:
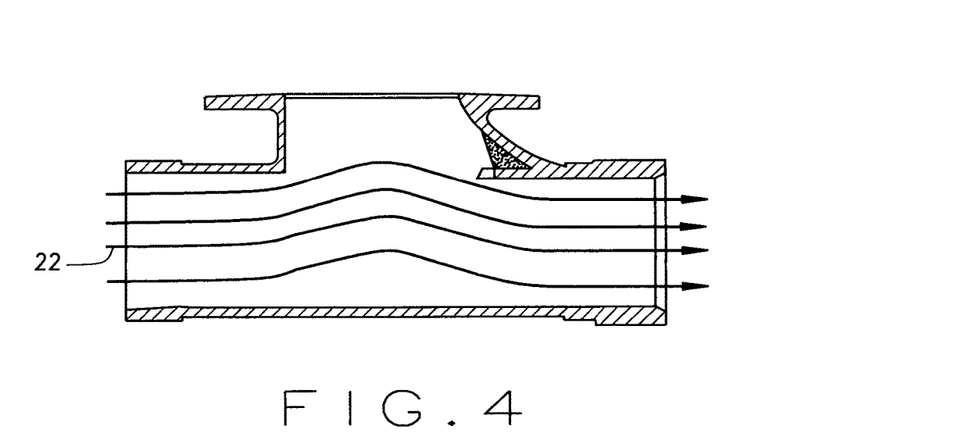
FIG. 4 discloses how material flow through the horizontal portion of the tee will have a tendency to slightly elevate at the location of its vertical conduit and therefore can bias unloading material against the curved portion of the tee, but which forms the wear pad of such material as can be noted.

FIG. 4 provides a schematic to show how the air and material 22 flowing through a tee 1, along the outlet line, has a tendency to rise up against the internal arcuate portion of the tee 1, to fill in above its ledge and to form a wear pad to resist against premature abrasion.

Figures 5, 6, 7, 8:
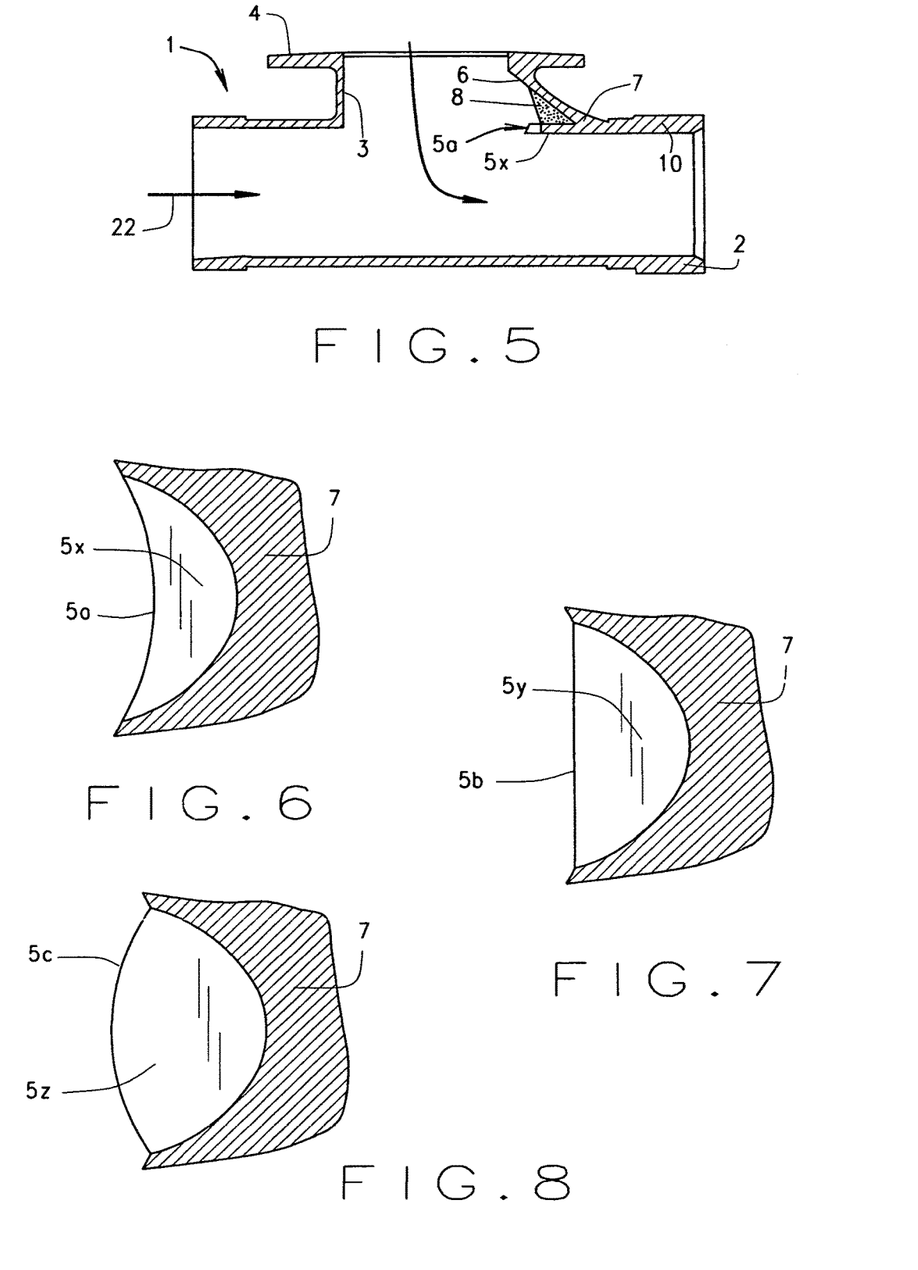
FIG. 5 is a longitudinal sectional view of a similar type tee, wherein the transition between the vertical portion of the tee and the horizontal portion of the tee has a flattened configuration.
FIG. 6 is a sectional view taken along 6-6 of FIG. 1, showing that the ledge has an arcuate configuration, shaped in a concaved form.
FIG. 7 is an alternate embodiment of the ledge having a straight configuration upon it exposed edge.
FIG. 8 is a sectional view relating to that taken along 6-6 of FIG. 1, but in this instance, shows the ledge having an arcuate configuration, but, of a convexed design.

That portion of the tee 1, where it transitions between its vertical section 3 to its horizontal section 2, and as previously described as a curved portion, in actuality, is a contoured part that may be formed as arcuate, or convexed, or it may be slightly concaved, or it may be simply a flat surface that transitions between the vertical to the horizontal part of the tee 1 at that location. Any one of these shapes can comprise the contour for the tee 1 where it transitions from its vertical section 3 to the horizontal section 2 in order to facilitate its unloading of the granular material.

As can also be seen in FIGS. 1, 2, 6, and 7, the ledge 5x, as cast or welded in place, at its frontal edge 5a, may be formed of a concaved shape, as aforesaid, and as shown in FIG. 7, the ledge 5y may be formed as a straight configuration 5b, or as shown in FIG. 8, the ledge 5z may even be formed slightly convex, at 5c, in design. The object is to catch and collect the granular material as it flows through the tee, whether it is dropped vertically through the vertical section, or flows through its horizontal longitudinal section 2, as previously explained with respect to FIGS. 3 and 4.

Variations or modifications to the subject matter of this invention may occur to those skilled in the art upon review of the disclosure as provided herein. Such variations, if within the spirit of this invention, are intended to be encompassed within the scope of any claims to patent protection issuing herein. The description of the preferred embodiment of this invention, and its disclosure in the drawings, are set forth for illustrative purposes only.

The invention claimed is:

1. A structured hopper tee with a wear pocket, provided to resist abrasion within the hopper tee during an unloading of granular material through an outlet pipe during an unloading process, the structured hopper tee being applied to the hopper bin of a tank trailer or other vehicle during usage, the structured hopper tee having a horizontal section through which granular material is unloaded and the horizontal section having two openings at longitudinally opposite ends, the tee having a vertical section having an inlet end having an outwardly extending flange portion into which granular material drops from a tank trailer or hopper bin into the tee during unloading of granular material, the vertical section being integral with the horizontal section of the tee and having a front section having a curved interior portion to aid in the flow of granular material, the curved interior portion is between the flange portion and the horizontal section of the tee with a portion of the curved interior portion including a sweeping internal convex arc that extends longitudinally from the flange portion to the horizontal section, a ledge formed in the front section of the tee, where the front section transitions into the horizontal section, the ledge being horizontally aligned with the horizontal section of the tee, a frontal edge of the ledge extending transversely with respect to the horizontal section, and the ledge extending out from the horizontal section of the tee where the front section transitions into the horizontal section of the tee, the ledge provided for accumulation of granular material between the curved interior portion of the front section of the vertical section of the tee and upon the ledge to form a wear pad of captured granular material against which other granular material impinges as granular material is being unloaded and thereby prevents direct exposure of the curved interior portion of the front section of the vertical section of the tee with granular material being unloaded to resist and reduce any abrasion or wearout of the tee at that location.

2. The structured hopper tee with a wear pocket of claim 1, wherein the ledge is integral of the structured hopper tee and cast in place internally of the structured hopper tee.

3. The structured hopper tee with a wear pocket of claim 1 wherein the ledge is design cut and welded in place within the structured hopper tee.

4. The structured hopper tee with a wear pocket of claim 1 wherein the frontal edge having an arcuate configuration.

5. The structured hopper tee with a wear pocket of claim 1 wherein the frontal edge being beveled.

6. The structured hopper tee with a wear pocket of claim 1 wherein the frontal edge having a concave configuration.

7. The structured hopper tee with a wear pocket of claim 1, wherein the frontal edge having a beveled configuration.

8. The structured hopper tee with a wear pocket with wear pocket of claim 1 wherein the frontal edge has a straight configuration.

9. The structured hopper tee with a wear pocket of claim 1 wherein the frontal edge having a straight configuration and the frontal edge being beveled.

10. The structured hopper tee with a wear pocket of claim 1 wherein the frontal edge having a convex configuration and the frontal edge being beveled.

11. The structured hopper tee with a wear pocket of claim 1 wherein the horizontal section further comprises an additional opening opposite the vertical section that can allow granular material to drop out the additional opening.

12. A structured hopper tee for application to the hopper bin of a tank trailer or other vehicle for unloading granular material, comprising: said tee having a horizontal longitudinal section having an inlet end and an outlet end; a vertical section for the tee integral with the horizontal longitudinal section, the vertical section having an inlet end having an outwardly extending flange portion, for connection with a hopper bin, a front section having a curved interior portion to transition from the vertical section to the horizontal longitudinal section, the curved interior portion being between the inlet end and the horizontal longitudinal section with a portion of the curved interior portion including a sweeping internal convex arc that extends longitudinally from the flange portion to the horizontal section, a ledge formed in the front section of the tee, where the front section transitions into the horizontal longitudinal section, the ledge being horizontally aligned with the horizontal longitudinal section of the tee, a frontal edge of the ledge extending transversely with respect to the horizontal section, and the ledge extending out from the horizontal longitudinal section of the tee where the front section transitions into the horizontal longitudinal section of the tee, and the ledge forming a wear pocket into which granular material can be captured to form a wear pad against which other material can flow against to prevent exposure of the curved interior portion of the tee and prevent abrasion.

13. The structured hopper tee of claim 12 wherein the frontal edge having an arcuate configuration.

14. The structured hopper tee of claim 12 wherein the frontal edge having a straight configuration and the frontal edge being beveled.

15. The structured hopper tee of claim 12 wherein the frontal edge having a concave configuration.

16. A structured hopper tee for application to the hopper bin of a tank trailer or other vehicle, for unloading granular material, comprising: said tee having a horizontal longitudinal section having an inlet end and an outlet end; said tee having a vertical section integral with the horizontal longitudinal section, the vertical section having an inlet end having an opening, an outwardly extending flange portion, for connection to a hopper bin, a front section having a curved front interior to transition from the opening of the vertical section to the said horizontal longitudinal section of the said tee, the curved front interior being between the flange portion and the horizontal longitudinal section with a portion of the curved front interior including a sweeping internal convex arc that extends longitudinally from the flange portion to the horizontal longitudinal section, a ledge formed in the front section of the tee, the ledge being horizontally aligned with the horizontal longitudinal section of the tee, a frontal edge of the ledge extending transversely with respect to the horizontal section, and the ledge extending out from the horizontal longitudinal section of the tee where the curved front interior of said vertical section of said tee transitions into the horizontal longitudinal section of the tee, and the ledge and the curved front interior forming a wear pocket into which granular material can be captured to form a wear pad against which other material can flow upon to prevent exposure of the curved front interior to abrasion.

17. The structured hopper tee of claim 16 wherein the frontal edge having an arcuate configuration.

18. The structured hopper tee of claim 16 wherein the frontal edge having a concave configuration.

19. The structured hopper tee of claim 16 wherein the frontal edge having a straight configuration.

20. The structured hopper tee of claim 16 wherein the frontal edge having a convex configuration.

* * * * *